United States Patent
Wirth et al.

(10) Patent No.: US 11,339,599 B2
(45) Date of Patent: May 24, 2022

(54) DRIVE DEVICE FOR A VEHICLE FLAP

(71) Applicant: Edscha Engineering GmbH, Remscheid (DE)

(72) Inventors: Andre Wirth, Remscheid (DE); Jochen Bals, Dortmund (DE)

(73) Assignee: EDSCHA ENGINEERING GMBH, Remscheid (DE)

( * ) Notice: Subject to any disclaimer, the term of this patent is extended or adjusted under 35 U.S.C. 154(b) by 208 days.

(21) Appl. No.: 16/628,678

(22) PCT Filed: Jul. 6, 2018

(86) PCT No.: PCT/DE2018/100624
§ 371 (c)(1),
(2) Date: Jan. 5, 2020

(87) PCT Pub. No.: WO2019/007467
PCT Pub. Date: Jan. 10, 2019

(65) Prior Publication Data
US 2020/0217118 A1    Jul. 9, 2020

(30) Foreign Application Priority Data
Jul. 6, 2017 (DE) .......................... 102017115183.4

(51) Int. Cl.
*F16H 3/00* (2006.01)
*E05F 3/00* (2006.01)
(Continued)

(52) U.S. Cl.
CPC .............. *E05F 3/00* (2013.01); *E05F 15/622* (2015.01); *F16H 25/2454* (2013.01);
(Continued)

(58) Field of Classification Search
CPC ......... F16H 2025/2075; F16H 25/2454; E05Y 3/00; E05Y 15/622; E05Y 2900/531; E05Y 2201/702; E05Y 2201/70; E05Y 2201/246
See application file for complete search history.

(56) References Cited

U.S. PATENT DOCUMENTS 5,689,994 A * 11/1997 Nagai ...................... B23Q 5/34
74/89.32
6,471,017 B1    10/2002 Booz et al.
(Continued)

FOREIGN PATENT DOCUMENTS

DE    3906069 A1    8/1990
DE    19752543 A1    6/1999
(Continued)

OTHER PUBLICATIONS

Corresponding PCT International Search Report of PCT/DE2018/100624.
(Continued)

*Primary Examiner* — David M Fenstermacher (57) ABSTRACT

A drive device for a pivoting vehicle flap, includes a first housing part (3), a second housing part (4), wherein the first housing part (3) and the second housing part (4) are designed to be movable toward each other in the direction of the axial extension (x) of the drive device (1), a spindle rod (12) rotatably arranged on one of the first housing part (3) and the second housing part (4) and a spindle nut (13) arranged in a rotatably fixed manner on the other of the first housing part (3) and the second housing part (4), a braking device (19), comprising a first brake element, which is connected to the spindle rod (12) in a rotatably fixed manner, a second brake element, which is connected to one of the first housing part (3) and the second housing part (4) in a rotatably fixed manner, wherein the first brake element can interact with the
(Continued)

second brake element in order to generate a brake force, and a magnet arrangement for generating a magnetic field. The drive device (1) is for a pivoting vehicle flap, to provide automatic pivoting and a flexible holding force for the vehicle flap, such that at least one of the first brake element and the second brake element can be displaced in the axial direction (x) of the spindle rod (12) by the magnetic field.

20 Claims, 3 Drawing Sheets

(51) Int. Cl.
*E05F 15/622* (2015.01)
*F16H 25/24* (2006.01)
*F16H 25/20* (2006.01)

(52) U.S. Cl.
CPC ..... *E05Y 2201/246* (2013.01); *E05Y 2201/70* (2013.01); *E05Y 2201/702* (2013.01); *E05Y 2900/531* (2013.01); *F16H 2025/2075* (2013.01)

(56) References Cited

U.S. PATENT DOCUMENTS

| | | | |
|---|---|---|---|
| 10,180,169 B2 | 1/2019 | Strobel | |
| 10,280,674 B2 | 5/2019 | Leonard et al. | |
| 2007/0179006 A1* | 8/2007 | Kachouh | H02K 7/1023 475/154 |
| 2011/0271595 A1* | 11/2011 | Eggeling | E05F 15/622 49/358 |
| 2014/0224045 A1* | 8/2014 | Kummer | F16H 19/02 74/60 |
| 2015/0040698 A1* | 2/2015 | Kessler | E05F 15/60 74/89 |
| 2016/0084360 A1* | 3/2016 | Foucaut | F16H 25/24 74/89.23 |
| 2016/0087565 A1* | 3/2016 | Watanabe | B60J 5/06 318/503 |
| 2017/0226789 A1* | 8/2017 | Link | E05F 15/622 |
| 2017/0247929 A1* | 8/2017 | Lombrozo | E05F 15/63 |
| 2019/0032387 A1 | 1/2019 | Wolker | |
| 2019/0093750 A1* | 3/2019 | Matsuto | F16H 25/2204 |
| 2019/0284861 A1* | 9/2019 | Goto | E05F 15/622 |
| 2020/0087001 A1* | 3/2020 | Dyer | B64D 29/06 |
| 2020/0217118 A1* | 7/2020 | Wirth | E05F 15/622 |
| 2020/0313508 A1* | 10/2020 | Matsuto | H02K 11/33 |
| 2020/0370357 A1* | 11/2020 | Schmengler | E05F 5/025 |
| 2020/0376940 A1* | 12/2020 | Yamagata | E05D 13/1238 |
| 2021/0062565 A1* | 3/2021 | Joko | E05F 15/40 |
| 2021/0230923 A1* | 7/2021 | Yokozawa | E05F 15/611 |
| 2021/0270075 A1* | 9/2021 | Sakiyama | F16H 25/20 |
| 2021/0293071 A1* | 9/2021 | Leonard | E05F 15/622 |

FOREIGN PATENT DOCUMENTS

| | | |
|---|---|---|
| DE | 102007026796 A1 | 8/2008 |
| DE | 102014220414 A1 | 4/2016 |
| DE | 102016207415 A1 | 10/2016 |
| DE | 102015221067 A1 | 5/2017 |
| EP | 2432101 A1 | 3/2012 |

OTHER PUBLICATIONS

Corresponding PCT International Preliminary Report on Patentability of PCT/DE2018/100624.

* cited by examiner

DRIVE DEVICE FOR A VEHICLE FLAP

The invention relates to a drive device for a pivotable vehicle.

BACKGROUND

Drive devices for pivotable vehicle flaps are known from practice which are hingedly connected to a body part of the vehicle at a first end and hingedly connected to a vehicle door at a second end. The drive devices are generally designed as linear drives such that, in operation, the first end of the drive device and the second end of the drive device are linearly movable relative to each other, as a result of which the vehicle door is pivoted in a motor-driven manner. Thus the role of the drive device is for one that of ensuring the vehicle door is automatically pivotable between a closed position and an open position and further to provide an arrest of the vehicle door in any position between the fully closed and fully open position. Accordingly, the drive devices for pivotable vehicle flaps should, in addition to the drive function, also provide a braking function during the displacement of the vehicle flap.

DE 197 52 543 A1 discloses a magnetic brake having a first rotationally fixed brake element and a second rotatable brake element. In a braking position of the magnetic brake, the first brake element and the second brake element are frictionally or positively interconnected such that the first brake element is held or at least braked by the second brake element. The magnetic brake therein comprises an electromagnet, which, with appropriate current supply, displaces the first and the second brake element with respect to each other into the braking position or a disengaged position, wherein the braking force in the braking position has a particular value. The magnetic brake comprises, in addition to an electromagnet, a permanent magnet and a spring device which biases the first brake element and the second brake element toward the braking position. A drawback of the disclosed magnetic brake is that the braking force cannot be flexibly adapted, but rather substantially assumes only a particular value in the braking position.

DE 10 2007 026 796 A1 discloses a door arrester for vehicle doors, wherein the door arrester comprises a brake device, wherein the brake device comprises a first brake element and a second brake element, which brake elements each have mutually facing friction surfaces, wherein a rotational movement of the first brake element relative to the second brake element is decelerated by contact of the friction surfaces. The first brake element and the second brake element therein are made of a ferromagnetic material, wherein the brake elements are reversibly magnetizable. The brake device further comprises a spring element which biases the first brake element relative to the second element toward a disengaged position of the brake device. A drawback of the disclosed door arrestor is that the braking force of the brake device is significantly influenced by the spring element and also the electromagnet must be energized in order to achieve a permanent braking action. By providing a spring, the brake device is also susceptible to faults.

DE 39 06 069 A1 discloses a brake device comprising a first brake element and a second brake element, which brake elements each have a brake pad and at least one compression spring being associated with each brake element. The brake device has a housing in which a current-carrying magnetic coil is received. The compression springs associated with each of the brake elements bias the brake elements such that the respective brake pads are in contact with each other and thus the brake device is in a braking position. By energizing the coil, the brake elements are displaced relative to each other such that the brake device is brought into a disengaged position, i.e. the brake pads of the brake elements no longer touch. A drawback of the disclosed brake device is that additional springs are associated with each brake element, as a result of which the susceptibility of the brake device to faults increases and the braking force cannot be precisely controlled.

DE 10 2015 221 067 A1 discloses a drive device for a pivotable vehicle flap, comprising a first housing part and a second housing part, wherein the first housing part and the second housing part are designed to be movable relative to each other in the direction of the axial extension of the drive device. A spindle rod is rotatably arranged on the first housing part and a spindle nut is non-rotatably arranged on the second housing part. A drive device is arranged in the first housing part, wherein the drive device comprises an electric motor. The electric motor has a housing, wherein a first brake element, consisting of a return element and a permanent magnet element rigidly connected to the return element, is rigidly connected to an inner wall of the housing. Further the electric motor comprises a drive shaft, on which a second brake element, likewise consisting of a return element and a permanent magnet element, is non-rotatably arranged. An intermediate element is arranged between the permanent elements. The permanent magnet elements are used for generating a braking force between the brake elements and thus for a deceleration of the drive shaft of the electric motor. A drawback of the disclosed drive device is that the braking force is not variable and the holding force is not flexible, as it is defined by the permanent magnets and cannot be varied further.

SUMMARY

The present disclosure provides a drive device for a pivotable vehicle flap, which drive device provides simple and reliable automatic pivoting as well as a flexible holding force for a vehicle flap.

According to one aspect of the invention, a drive device for a pivotable vehicle flap is provided, comprising a first housing part and a second housing part, wherein the first housing part and the second housing part are designed to be movable relative to each other in the direction of the axial extension of the drive device. The drive device further comprises a spindle rod, wherein the spindle rod is rotatably arranged on one of the first housing part and the second housing part. The drive device further comprises a spindle nut non-rotatably arranged on the other of the first housing part and the second housing part, and a brake device. The brake device comprises therein a first brake element non-rotatably connected to the spindle rod, and a second brake element non-rotatably connected to one of the first housing part and the second housing part, wherein the first brake element can interact with the second brake element to generate a braking force. Finally, the drive device comprises a magnet arrangement for generating a magnetic field. At least one of the first brake element and the second brake element can be displaced by the magnetic field in the axial direction of the spindle rod. This advantageously makes it possible to influence the braking force caused by the brake device in a controlled manner by controlling the magnetic field strength of the magnetic field. Particularly advantageously, continuous holding of the vehicle door for a wide variety of situations and external circumstances, such as temperature, opening angle and forces acting on the vehicle door from the outside, can be achieved by setting the magnetic field strength.

The first housing part and the second housing part are expediently components of a housing of the drive device, wherein the first housing part and the second housing part are arranged concentrically with respect to each other. The housing advantageously makes it possible to protect movable mechanical and electrical components of the drive device from dirt and other external influences. In addition, it is thus avoided that a user comes into contact with internal components of the drive device and possibly gets injured in the process.

In a particularly preferred embodiment, the magnet arrangement comprises an electromagnet. As a result it is particularly advantageously achieved that the magnetic field strength, and thus the braking force which is generated by the brake device, can be defined by specifying the current intensity flowing through the electromagnet. The brake device particularly hereby preferably comprises an electric controller which can control the current intensity or electrical power of the electromagnet. The controller of the current intensity or electrical power of the electromagnet is particularly preferably programmable such that a predefined behavior of the brake device is possible depending on the prevailing circumstances at any one time. In this case, the current intensity or electrical power controlled by the electric controller depends on external parameters such as the instantaneous acceleration of the pivotable vehicle flap or the forces acting on the pivotable vehicle flap from the outside.

The magnet arrangement preferably comprises a permanent magnet. This advantageously makes it possible for a permanent braking force to be provided by the brake device, without the need for additional electrical power. The braking force can be expediently specified by appropriate selection of the permanent magnet or the magnetic field strength generated by the permanent magnet. The brake device particularly preferably comprises both an electromagnet and a permanent magnet, since a braking force is thus generated even in the de-energized state of the electromagnet, wherein it becomes possible to cancel the braking force as well as increase the braking force by appropriate selection of the current direction through the electromagnet.

The permanent magnet particularly advantageously magnetically attracts the one of the first brake element and the second brake element, which is designed to be axially displaceable, toward the other of the first brake element and the second brake element. In a further development one of the first brake element and the second brake element can be displaced in the axial direction of the spindle rod so far toward the other of the first brake element and the second brake element that the first brake element and the second brake element can touch. The first brake element particularly preferably has a first friction surface and the second brake element has a second friction surface. In this case, the first friction surface and the second friction surface are expediently facing each other and aligned substantially perpendicularly to the axial direction of the spindle rod. Advantageously, the braking force generated by the friction between the free surfaces on the spindle rod can thus be set depending on the situation by controlling the electromagnet. It is in particular provided that the first brake element and the second brake element can be displaced relative to each another so far that the first brake element and the second brake element do not touch. In this case, both the manual opening of the vehicle door and also the motorized moving of the vehicle door is facilitated such that the motor provided in the drive device can advantageously have smaller dimensions.

In an expedient embodiment, the magnet arrangement is arranged on the first brake element or the second brake element. Particularly advantageously it is provided, that the magnet arrangement is arranged on the second brake element, which is non-rotatably connected to one of the first housing part and the second housing part. Advantageously, the installation space required for the brake device is reduced and thus the entire drive device is designed to be more space-saving. It is expediently provided that the magnetic field which can be generated by the magnet arrangement penetrates the one of the first brake element and the second brake element, which is designed to be axially displaceable. As a result, the axial displacement of the brake element or the braking force between the first brake element and the second brake element is advantageously controlled by means of the magnetic field strength.

In a further development it is particularly advantageously provided that the one of the first brake element and the second brake element, which is designed to be axially displaceable, is designed to be at least partially ferromagnetic. Thereby it is expediently achieved that the magnet arrangement exerts a force in the axial direction on the one of the first brake element and the second brake element, which is designed to be axially displaceable, by means of the magnetic field generated by said magnet arrangement. The magnetic flux of the magnet arrangement and thus the braking force of the brake device is particularly advantageously controllable via an electrical controller.

The drive device expediently comprises a ball bearing, wherein the ball bearing radially surrounds a portion of the spindle rod and rotatably supports the spindle rod. The ball bearing is particularly preferably arranged between the spindle nut and the brake device. By the spacing of the ball bearing from the magnet arrangement it is advantageously prevented that the ball bearing from influences the magnetic field of the magnet arrangement within the brake device, or conversely the magnetic field influences metal components of the ball bearing.

In a further development of the drive device, the housing comprises a third housing part. In the third housing part, a drive means for driving the spindle rod is preferably arranged. Therein a first fastening device for hinging to one of the vehicle flap and the vehicle body is expediently arranged on an end of the first housing part remote from the third housing part. Furthermore it is expediently provided that a second fastening device for hinging to the other of the vehicle door and the vehicle body is arranged on an end of the third housing part remote from the first housing part. Therein one of the first fastening device and the second fastening device is designed as a ball socket. Particularly preferably, the other of the first fastening device and the second fastening device is designed as a ball joint eye. The drive device can thus be advantageously hingedly arranged between a vehicle body and a vehicle flap to be pivoted with respect to the vehicle body.

In a particularly preferred embodiment, the end of the third housing part remote from the first housing part consists at least partially of plastic. Advantageously, the overall weight of the drive device is thus reduced. Particularly advantageously, the end of the second fastening device facing the third housing part is positively received in the end of the third housing part that is remote from first housing part and consists partially of plastic. Particularly preferably overmoulding of the end of the second fastening device facing the third housing part is provided. Advantageously, this results in a particularly high strength and a good seal of the fastening device against external influences such as moisture.

The end of the first fastening device facing the first housing part is expediently positively received in the first housing part at least in portions. In particular preferably it is provided that the end of the first fastening device facing the first housing part is pressed into an opening in the first housing part, The first housing part is therein preferably hollow-cylindrical and concentrically encloses the end of the first fastening device facing the first housing part.

In a preferred embodiment, the first fastening device has a radially circumferential first groove, wherein a portion of the first housing part which tapers inwardly with respect to the inside diameter projects into the groove. As a result, the first fastening device is advantageously securely received in the first housing part in the axial direction and secured against displacement in the axial direction.

The first fastening device expediently has a second radially circumferential groove, wherein a sealing ring is provided in the second radially circumferential groove, which sealing ring seals the first fastening device with respect to the first housing part. Advantageously it is thus prevented, that moisture can penetrate into the housing.

In particular preferably it is provided that the other of the first housing part and the second housing part comprises at least one groove extending in parallel with the axial extension of the spindle rod. The spindle nut expediently has at least one radial projection which projects into the at least one groove. Thus a drive device is advantageously provided in which external torque support of the spindle nut is not necessary.

In a further development of the drive device it is provided, that the spindle nut can be displaced along the axial extension of the at least one groove. As a result, by rotating the spindle rod, which has an external thread, which in turn is in engagement with an internal thread provided in the spindle nut, the spindle nut can advantageously be displaced along the axial extension of the drive device or of the spindle rod.

The at least one groove is expediently designed as a negative form of the at least one radial projection. It advantageously follows for one that the spindle nut is guided exactly along the groove and also that the spindle nut is supported relative to the housing with respect to torques transmitted through the spindle rod.

The drive device expediently comprises a drive element, wherein the drive element is arranged in a drive housing concentrically with respect to the third housing part. In particular advantageously it is provided that the drive housing is designed as a hollow cylinder and is welded, along its outer circumference and at least in portions, to the third housing part. Thus it is advantageously achieved that the drive element or the receiving drive housing is arranged particularly securely and firmly in the third housing part. Furthermore it is advantageously made possible, that further mounting options can be realized, such as the laying of required electrical supply lines, in particular for the operation of the magnet arrangement provided in the brake device. For this purpose, a corresponding gap is provided between the outer circumference of the drive housing and the inner circumference of the third housing part, through which gap electrical supply lines can be laid.

It is provided expediently that the first housing part is translationally sealed with respect to the second housing part by means of a sealing ring. As a result, adequate sealing against moisture is advantageously achieved even during displacement of the first housing part with respect to the second housing part. In an advantageous embodiment, in order to prevent the sealing ring from being displaced in the axial direction during displacement of the first housing part with respect to the second housing part, the sealing ring is secured against axial displacement by means of a securing element. The securing element is particularly preferably designed as a sliding bush. The sliding bush can expediently be fastened to the second housing part by means of a latching element. This particularly advantageously makes it possible to replace the sealing ring in a simple manner. In a preferred embodiment, the sealing ring is additionally secured against axial displacement by means of at least one support ring.

BRIEF SUMMARY OF THE DRAWINGS

Further advantages, features and properties of the invention will become apparent from the following description of a preferred embodiment and from the dependent claims.

The invention will now be explained in more detail based on a preferred embodiment of the invention with reference to the accompanying drawings.

DETAILED DESCRIPTION

Figure 1:
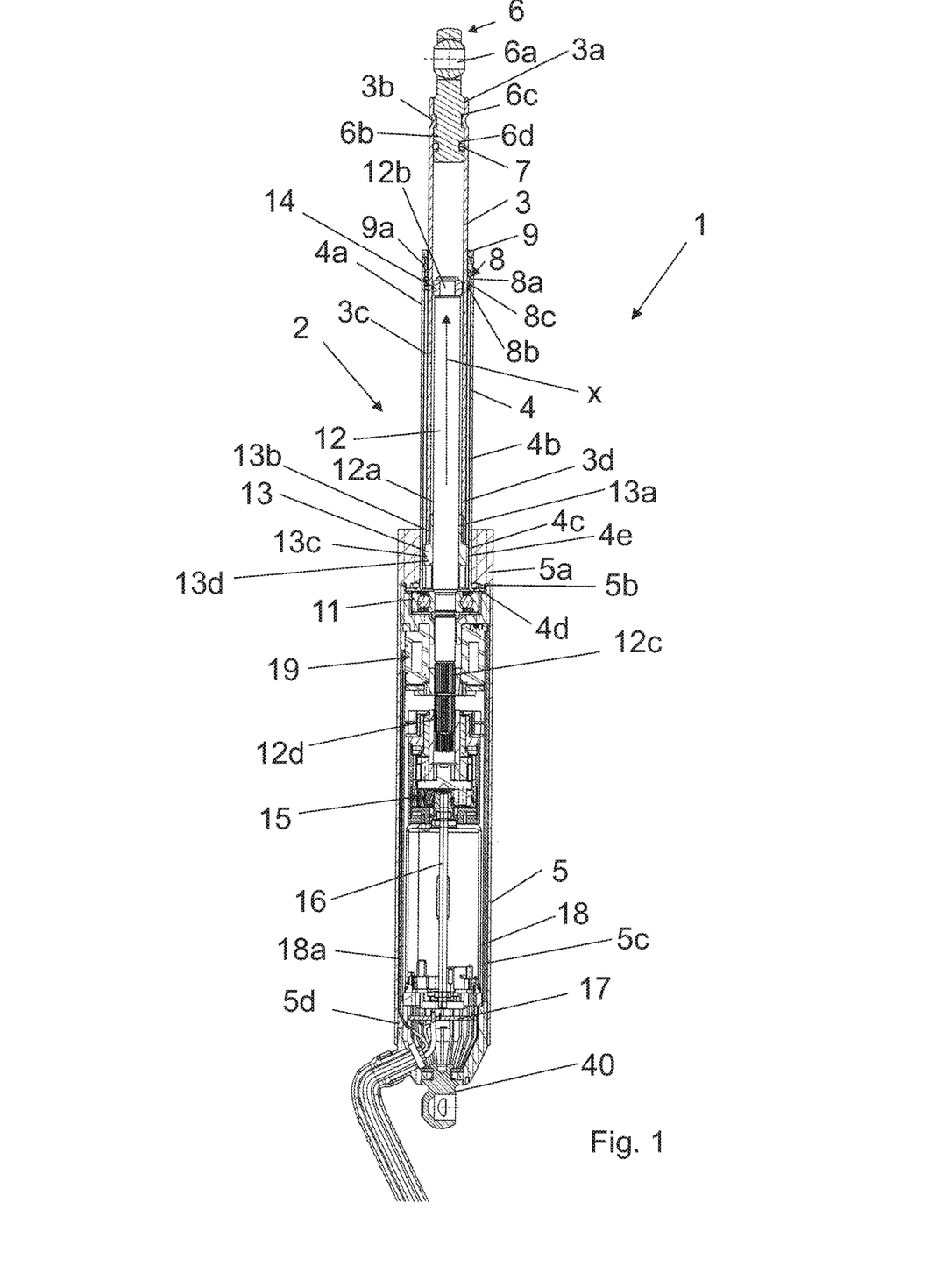
FIG. 1 shows a longitudinal section through an embodiment of a drive device according to the invention.

FIG. 1 is a sectional view of a preferred embodiment of a drive device 1. The drive device 1 comprises a housing 2 which comprises a first housing part 3, a second housing part 4 and a third housing part 5. The first, second and third housing part 3, 4, 5 are each designed as hollow cylinders arranged substantially concentrically with respect to one other. The first housing part 3 is made of steel, the first end 3a of the first housing part 3 remote from the second housing part 4 having an opening in which a first fastening device 6 is received at least in portions for hinging the drive device 1 to one of the vehicle body and the vehicle flap.

The first fastening device 6 has a ball joint eye 6a on an end remote from the first housing part 3, wherein the end 6b of the first fastening device 6 remote from the ball joint eye 6a has a first radially circumferential groove 6c and a second radially circumferential groove 6d. The first radially circumferential groove 6c is arranged closer to the ball joint eye 6a than the second radially circumferential groove 6d. In the region of the first radially circumferential groove 6c, the first housing part 3 has a tapering 3b, the tapered portion 3b of the first housing part 3 thus formed protruding into the first radially circumferential groove 6a such that the first fastening device 6 is axially secured to the first housing part 3 as a result. Furthermore, a sealing ring 7 is provided in the second radially circumferential groove 6d of the first fastening device 6, which sealing ring seals the first fastening device 6 with respect to the first housing part 3.

The first housing part 3 has a smaller outside diameter with respect to the second housing part 4 and is displaceably received concentrically in the hollow-cylindrical second housing part 4 at least in portions. In order to seal the first housing part 3 with respect to the second housing part 4, a sealing device 8 is provided at a first end 4a of the second housing part 4. The sealing device 8 is secured in the axial direction of the drive device 1 by means of a sliding bush 9.

The sliding bush 9 has a latching element 9a which is designed as a snap hook. The sealing device 8 is arranged in the radial direction between an inner wall 4b of the second housing part 4 and an outer wall 3c of the first housing part 3. The sealing device 8 comprises two support rings 8a, 8b, between which a sealing ring 8c is secured in the axial direction. The sealing ring 8c is preferably designed as an X-ring. This advantageously makes it possible for the first housing part 3 and the second housing part 4 to be displaceable relative to each another, wherein the penetration of moisture or dirt into the housing 2 is prevented by means of the sealing device 8.

The second housing part 4 projects with its second end 4c remote from the first end 4a at least in portions into a first end 5a of the third housing part 5. The second end 4c of the second housing part 4 has an annular cantilevered portion 4d which rests against an inner step 5b of the third housing part 5. This ensures that the second housing part 4 is secured in the axial direction toward the first fastening device 6. A ball bearing 11 rests against the front face of the cantilevered portion 4d facing away from the step 5b of the third housing part 5, which ball bearing radially encloses and thus rotatably supports a spindle rod 12 concentrically passing through the housing 2 at least in portions.

The spindle rod 12 has an external thread 12a, wherein the external thread 12a is in engagement with an internal thread 13a of a spindle nut 13. The spindle nut 13 is non-rotatably arranged on a second end 3d of the first housing part 3 such that, during a rotational movement of the spindle rod 12, the spindle nut 13 is displaced, together with the first housing part 3, relative to the second housing part 4 in the axial direction. The spindle nut 13 therein has a first portion 13b projecting into the second end 3d of the first housing part 3 such that the spindle nut 13 and the first housing part 3 are interconnected. A second portion 13c of the spindle nut has at least one projection 13d which projects in the radial direction and protrudes into a groove 4e extending along the inner wall 4b of the second housing part.

At a first end 12b, the spindle rod 12 has a guide ring 14 which is used for radially guiding the spindle rod 12 in the first housing part 3. At a second end 12c of the spindle rod 12, the spindle rod 12 has a plurality of notches 12d which extend in the axial direction and are used for driving the rotational movement of the spindle rod 12. The second end 12d of the spindle rod 12 therein is, via the notches 12d extending in the axial direction x of the spindle rod, in rotationally fixed engagement with a gear 15, wherein the gear 15 is connected to a drive element 17 via a coupling rod 16. The drive element 17 is received in a hollow-cylindrical drive housing 18, wherein the outer wall 18a of the drive housing 18 is welded at least in portions to an inner wall 5c of the third housing part 5. A second fastening device 40 is arranged at a second end 5d of the third housing part 5. The fastening device 40 is designed as a ball socket such that the drive device 1 can be hinged to one of the vehicle body and the vehicle flap.

A brake device 19 is provided in the axial direction between the gear 15 and the ball bearing 11. The structure of the brake device 19 and its mode of action will be explained in more detail below with reference to FIG. 2.

Figure 2:
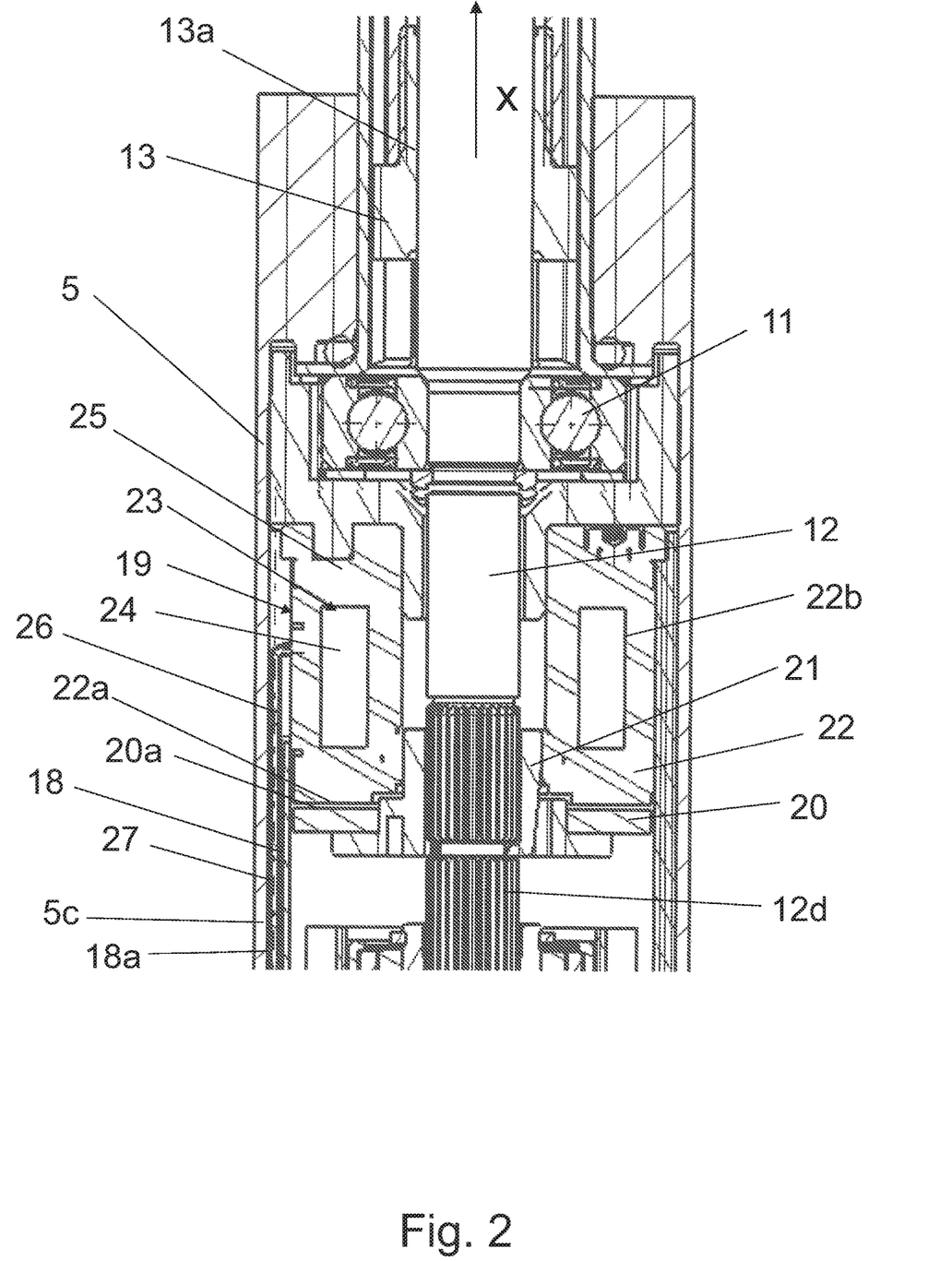
FIG. 2 shows an enlarged view of a brake device of the drive device from FIG. 1.

FIG. 2 shows an enlarged view of a brake device of the drive device from FIG. 1. The brake device 19 comprises a first brake element 20 which is non-rotatably connected to the spindle rod 12 and is mounted, so as to be floating with respect to the axial direction x, on a flange hub 21 which is pressed onto the notches 12d of the spindle rod 12 in a rotationally fixed manner. As a result, the brake element 20 can be displaced in the axial direction of the drive device 1, while the brake element 20 rotates together with the flange hub 21 or the driven spindle rod 12. The brake element 20 is designed as an annular brake disc having a first friction surface 20a which is made of a ferromagnetic material.

The brake device 19 further comprises a second brake element 22 which rests non-rotatably against the inner wall 5c of the third housing part 5. Accordingly, the second brake element 22 functions as a rotationally fixed brake stator, wherein the second brake element 22 has a second friction surface 22a facing the first friction surface 20a of the first brake element 20, wherein the first friction surface 20a does not touch the second friction surface 22a in the disengaged state of the brake device 19 shown here. The second brake element 22 has an annular cavity 22b, in which a magnet arrangement 23 is received.

The magnet arrangement 23 comprises an electromagnet 24 and a permanent magnet 25, which are successively arranged in the axial direction of the drive device 1. The permanent magnet 25 therein is spaced further away from the first brake element 20 than the electromagnet 24. The electromagnet 24 is powered via electrical supply lines 26. The electrical supply lines 25 extend in a gap 27 between the outer periphery 18a of the drive housing 18 and the inner wall 5c of the third housing part 5.

The mode of operation of the brake device 19 will be explained below with reference to the embodiment shown in FIG. 2:

In the state shown in FIG. 2, the first brake element 20 is displaced so far downward that the first friction surface 20a and the second friction surface 22a do not touch. Depending on the design, this state may be present in a de-energized state of the electromagnet 24 when the magnetic field of the permanent magnet 25 is oriented such that the ferromagnetic brake element 20 is repelled by the permanent magnet 25. In the present case, however, the magnetic field of the permanent magnet 25 is preferably oriented in such a way that the first brake element 20 is attracted toward the second brake element 22. The shown disengaged state of the brake device 19 is achieved therein by a magnetic flux oriented opposite to the magnetic field generated by the permanent magnet 25, which magnetic flux is generated by the electromagnet 24. In case that an increased braking force is necessary during pivoting of the vehicle door, the electromagnet 24 is switched off such that the first friction surface 20a of the first brake element 20 and the second friction surface 22a of the second brake element 22 touch. Due to the friction forces occurring here, the rotational movement of the spindle rod 12 non-rotatably connected to the first brake element 20 is decelerated. If the braking forces have to be further increased, the electromagnet 24 is powered in the reverse orientation direction such that the magnetic flux generated by the electromagnet 24 provides for an increased attractive force of the first brake element 20 toward the second brake element 22.

Figure 3:
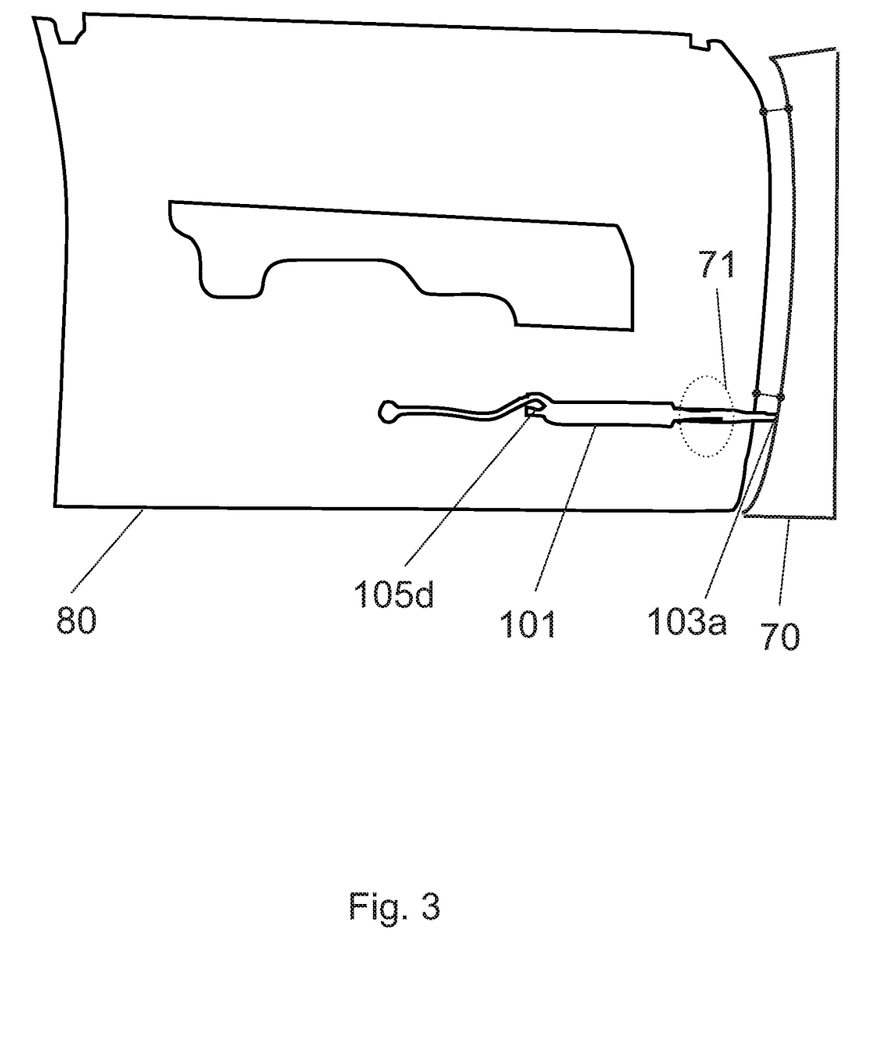
FIG. 3 shows a vehicle flap arranged on a vehicle body part and having a drive device.

FIG. 3 shows a vehicle flap 80 which is pivotably arranged on a vehicle body part 70 and comprises a drive device 101. In this case, the drive device 101 is hingedly connected to the vehicle body part 70 with a first end 103a and to the vehicle flap 80 with a second end 105d such that when the first end 103a is displaced relative to the second end 105d, the vehicle flap 80 is pivoted. For this purpose, the first end 103a of the drive device 101 is guided through a recess 71 of the vehicle door 80.

A drive device has been disclosed above with reference to an embodiment, in which drive device only the first brake element can be displaced in the axial direction. It has to be understood that, additionally or alternatively, the second brake element may be floatingly mounted, the second brake element still remaining rotationally fixed with respect to the housing and the first brake element rotating together with the spindle rod.

A drive device has been disclosed above with reference to an embodiment, in which device the housing parts, at least in part, project one into the other and are sealed with respect to one another. The housing parts are accordingly elongated such that the housing composed of the housing part envelopes almost the full length of the drive device. It has to be understood that the housing parts may also have a compact design such that they envelope only the spindle rod and the spindle nut. The housing parts do not have to be sealed with respect to one other. As a result, the dead weight of the drive device and the material costs can be reduced.

What is claimed is:

1. A drive device for a pivotable vehicle flap, comprising
a first housing part,
a second housing part, wherein the first housing part and the second housing part are configured to be movable relative to each other in a direction of an axial extension of the drive device,
a spindle rod rotatably arranged on one of the first housing part and the second housing part,
a spindle nut non-rotatably arranged on the other of the first housing part and the second housing part,
a brake device comprising a first brake element, the brake device further comprising a second brake element non-rotatably connected to one of the first housing part and the second housing part, wherein the first brake element is interactable with the second brake element to generate a braking force, and
a magnet arrangement for generating a magnetic field,
wherein the first brake element is non-rotatably connected to the spindle rod, and
wherein the first brake element is displaceable in an axial direction of the spindle rod by the magnetic field.

2. The drive device according to claim 1, wherein the first housing part and the second housing part are components of a housing of the drive device, wherein the first housing part and the second housing part are arranged concentrically with respect to each other.

3. The drive device according to claim 1, wherein the magnet arrangement comprises an electromagnet.

4. The drive device according to claim 1, wherein the magnet arrangement comprises a permanent magnet.

5. The drive device according to claim 4, wherein the permanent magnet magnetically attracts the first brake element toward the second brake element.

6. The drive device according to claim 1, wherein the one of the first brake element and the second brake element can be displaced in the axial direction so far toward the other of the first brake element and the second brake element that the first brake element and the second brake element can touch each other.

7. The drive device according to claim 1, wherein the first brake element has a first friction surface and the second brake element has a second friction surface.

8. The drive device according to claim 7, wherein the first friction surface and the second friction surface face each other and are aligned perpendicularly to the axial direction of the spindle rod.

9. The drive device according to claim 1, wherein the magnet arrangement is arranged on the second brake element.

10. A drive device for a pivotable vehicle flap, comprising
a first housing part,
a second housing part, wherein the first housing part and the second housing part are configured to be movable relative to each other in a direction of an axial extension of the drive device,
a spindle rod rotatably arranged on one of the first housing part and the second housing part,
a spindle nut non-rotatably arranged on the other of the first housing part and the second housing part,
a brake device comprising a first brake element and a second brake element, wherein one of the first brake element and the second brake element is displaceable in an axial direction of the drive device so far toward the other of the first brake element and the second brake element that the first brake element and the second brake element can touch each other, and
a magnet arrangement for generating a magnetic field,
wherein the first brake element is displaceable in an axial direction of the spindle rod towards the second brake element by the magnetic field.

11. The drive device according to claim 10, wherein the magnet arrangement comprises an electromagnet.

12. The drive device according to claim 10, wherein the first brake element has a first friction surface and the second brake element has a second friction surface.

13. The drive device according to claim 12, wherein the first friction surface and the second friction surface are facing each other and are aligned substantially perpendicularly to the axial direction of the spindle rod.

14. A drive device for a pivotable vehicle flap, comprising
a first housing part,
a second housing part, wherein the first housing part and the second housing part are configured to be movable relative to each other in a direction of an axial extension of the drive device,
a spindle rod rotatably arranged on one of the first housing part and the second housing part,
a spindle nut non-rotatably arranged on the other of the first housing part and the second housing part,
a brake device comprising a first brake element non-rotatably connected to the spindle rod, a second brake element non-rotatably connected to one of the first housing part and the second housing part, wherein the first brake element is interactable with the second brake element to generate a braking force, and
a magnet arrangement for generating a magnetic field,
wherein the magnet arrangement comprises an electromagnet and a permanent magnet, and
wherein at least one of the first brake element and the second brake element is displaceable in an axial direction of the spindle rod by the magnetic field.

15. The drive device according to claim 14, wherein the permanent magnet magnetically attracts the one of the first brake element and the second brake element, which is configured to be axially displaceable, toward the other of the first brake element and the second brake element.

16. The drive device according to claim 14, wherein the one of the first brake element and the second brake element is displaceable in the axial direction so far toward the other of the first brake element and the second brake element that the first brake element and the second brake element can touch each other.

17. The drive device according to claim 16, wherein the first brake element and the second brake element are displaceable relative to each another to such an extent that the first brake element and the second brake element do not touch.

18. The drive device according to claim 14, wherein the one of the first brake element and the second brake element, which is configured to be axially displaceable, is configured to be at least partially ferromagnetic.

19. The drive device according to claim 18, wherein the magnetic field generated by the magnet arrangement penetrates the one of the first brake element and the second brake element, which is configured to be axially displaceable.

20. The drive device according to claim 14, wherein an axial displacement of the one of the first brake element and the second brake element, which is configured to be axially displaceable, is controlled by the magnetic field strength generated by the magnet arrangement.

\* \* \* \* \*